WELL TREATING METHODS USING TEMPERATURE SURVEYS

Original Filed June 7, 1968 2 Sheets-Sheet 1

INVENTORS
Jerry H. Guinn
BY William S. Wright
Cesar Ashley
and Walter J. Jaeger
ATTORNEYS

WELL TREATING METHODS USING TEMPERATURE SURVEYS

Original Filed June 7, 1968

2 Sheets-Sheet 2

INVENTORS
Jerry H. Guinn
BY William S. Wright
Cesfastings Ackley
and Walter J. Jungman
ATTORNEYS United States Patent Office Re. 27,459
Reissued Aug. 15, 1972

27,459
WELL TREATING METHODS USING TEMPERATURE SURVEYS

Jerry H. Guinn, Amarillo, and William Sherwood Wright, Houston, Tex., assignors to Cardinal Chemical Inc., Odessa, Tex., and Producers Chemical Service Company, Amarillo, Tex.

Original No. 3,480,079, dated Nov. 25, 1969, Ser. No. 735,313, June 7, 1968. Application for reissue Nov. 9, 1970, Ser. No. 87,862
Int. Cl. E21b *43/20, 43/24, 47/00*
U.S. Cl. 166—250 27 Claims

Matter enclosed in heavy brackets [ ] appears in the original patent but forms no part of this reissue specification; matter printed in italics indicates the additions made by reissue.

ABSTRACT OF THE DISCLOSURE

A method of treating wells to stimulate production from or to increase acceptance of fluids in the well strata by controlled selective treatment of the formations of the well in conjunction with temperature evaluation. Blocking and propping agents are utilized to block off each zone or strata as it is treated. Temperature gradient curves and temperature differential curves are utilized to determine the strata treated and, where multiple strata are being treated, to trace the entry of treating fluids into such strata sections or adjacent strata, and utilizing the information obtained from the temperature log to design the next stage of treatment. The process permits step by step treatment of all zones in the well, and a determination of the fact that all zones have been treated. Blocking or diverting materials may be combined with propping agents to expedite the process.

This invention relates to [the] *a new and improved* method of treating wells to stimulate production from or injection into the well strata, and the process and materials used in connection therewith.

It is an important object of the invention to provide an improved method for treating wells utilizing down-hole temperature logging equipment to record the temperature gradient and the temperature differentials in the well bore to trace the entry of treating fluids into formations being treated and to determine the extent of entry of such fluids into productive sections or adjacent areas, and to use the inforamtion obtained by such logging equipment to design the stages of treatment of the well and to select materials to be used in effecting such treatment.

Another object of the invention is to provide a process by means of which the movement of fluids into or out of selected zones of a well bore drilled through subsurface strata of varying zones of permeability and porosity *may be controlled, stimulated and the extent thereof determined.*

A further object of the invention is to provide means for achieving proper down-hole diversion of the various stages of a multistage stimulation treatment, such as acidizing and/or hydraulic fracturing, temporary or permanent squeezing of treating fluids into the well formations to effect the desired movement of fluids into or out of and to control such movement of fluids into or out of selected zones in the well bore.

A further object of the invention is to provide a system and materials for utilization in effecting the treatment of the wells as hereinabove set forth.

Additional objects and advantages of the invention will be readily apparent from the reading of the following description of the method, system and materials utilized in accordance with the invention and reference to the accompanying drawings, wherein.

Figures 1, 2, 3:
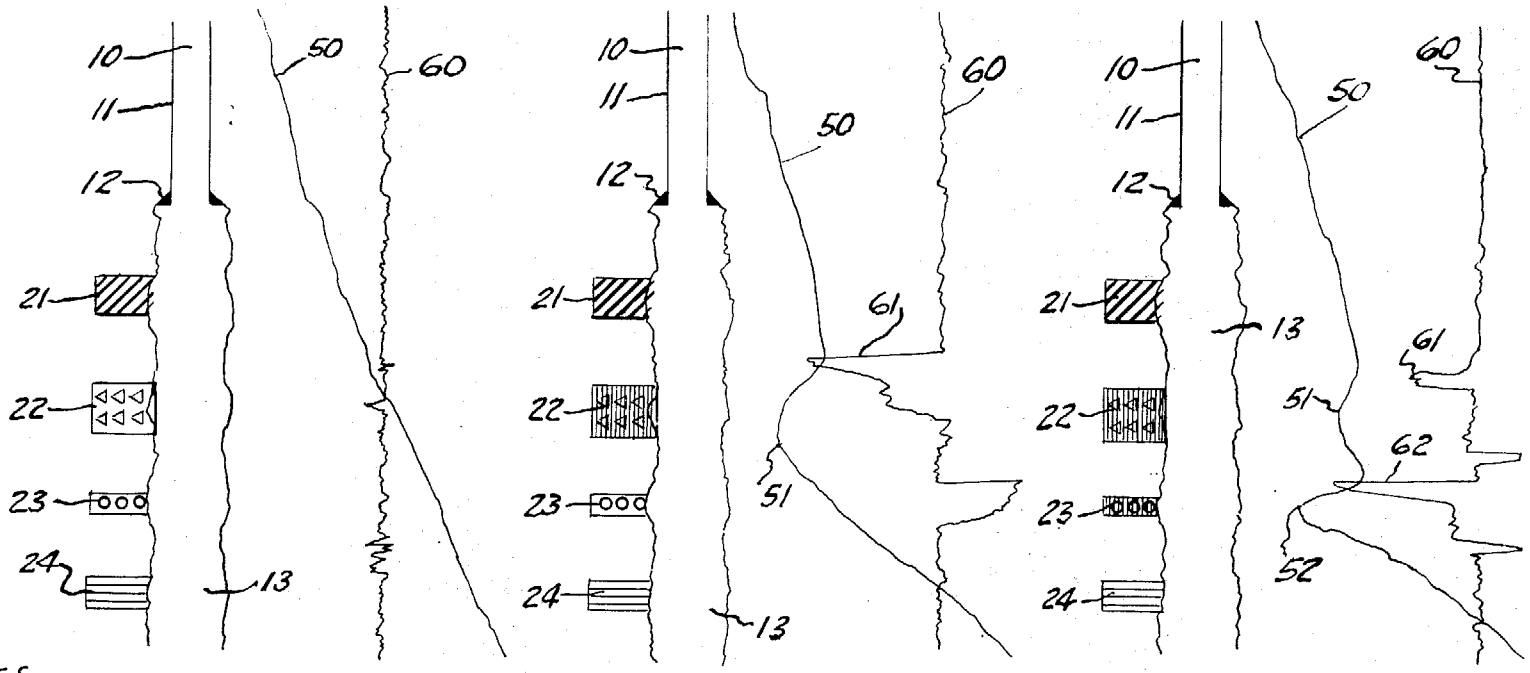
FIGURE 1 is a schematic view of a well bore having alongside a temperature log representing the temperature gradient curve and the temperature differential curve for the well bore indicated.
FIGURE 2 is a view similar to FIGURE 1 showing a treatment of the well in accordance with the invention in the second from upper zone or strata of the well.
FIGURE 3 is a view similar to FIGURE 2 showing the second zone blocked and the third zone undergoing treatment.

Long open hole, or heavily perforated intervals, with zones or strata of varying porosities and permeabilities have always been difficult stimulation problems. Continuous treatment processes heretofore used with various types of blocking agents or diverting agents have not permitted any evaluation of the treatment being effected, because only after the complete process had been accomplished could any down-hole evaluation of the success of the diverting agents and the treating agents be estimated. As a result, critical information such as the extent of the formation treated per stage, communicating zones, channeling behind the casing, and other information was unavailable until after the treatment had been completed. This invention has to do with the method of treating wells wherein a temperature survey is effected immediately after each stage of treatment of the well to provide for an immediate[ly] evaluation of the results of the treatment and to provide information from which additional stages of treatment may be designed and effected. As each stage is carried out by pumping the treating fluids into the well, it is in turn evaluated by a temperature survey, and the proper amount of treating fluids or materials is calculated for the subsequent treating stages.

For example, in the Permian Basin and Anadarko Basin, many of the wells have been drilled long previously and have large open holes below the casing string, long sections and numerous zones of varying porosities and permeabilities; or, have been shot with nitroglycerin or the like to fracture the formation to increase production, and sometimes treated with acid or other treating fluids. Later wells have had long strings of perforations shot through casing which had been set through the pay sections, and more recent completions have had a limited number of perforations through the casing extending over a considerable distance in the well bore, or located at several different intervals in the well bore.

As a result, wells of these types usually have one or more of the following conditions present: zones with different bottom hole treating pressures, communication or intercommunication between zones, intervals too long to be successfully stimulated in one stage, channeling between zones or behind the casing, "thief zones" and other conditions which prevent successful treatment of all zones by the continuous multistage stimulation method. Such formerly used process involved the treatment of the well without the cessation of pumping by introducing a first stimulation stage, such as acid, water, oil, and so forth; the introduction of a predetermined amount of diverting or blocking material; the pumping of the next stimulation stage; the introduction of another diversion or blocking stage; and the continuance of this process until all stimulation stages calculated to be necessary were pumped into the well in an attempt to effect treatment of all zones; and continued until all zones of fluid entry into the well bore or from the well bore were sealed. At no time during this operation was the process stopped and downhole evaluation made as to the success of the various diversion and treatment stages, so that the success of the operation was contingent upon arbitrary estimation of the proper volumes of treating matreials and diverting materials to be introduced.

The method of this invention consists in running a temperature logging tool, such as that made and sold by Radiation Engineering and Manufacturing Company of Fort Worth, Tex., by means of which a plot of temperature against depth is effected. In addition, the temperature gradient curve obtained as a result of the recording of the temperature change due to the bore passing through the various earth formations, a temperature differential curve is recorded simultaneously by such device which indicates changes in that temperature, showing the temperature differential obtained by recording continuously and instantaneously the first derivative of the gradient log by making measurements a slight vertical distance apart, storing or delaying the original measurement with a memory system in the tool, or delay system in the tool, and then recording such first derivative of the change as the tool progresses through the well bore.

This temperature logging tool is a commercially available tool and itself forms no part of this invention. However, the method of utilizing the tool is an essential part of the invention.

In carrying out the invention, the first step is *establishing a base temperature curve for the well, as by* the running of a base temperature log for the well. This log is run prior to starting any stimulation or treatment of the well. The log so obtained points out any down-hole temperature anomalies present in the well prior to treating, and so provides a means for better interpretation of subsequest logs. The schematic illustration of FIGURE 1 indicates a well bore 10 having a casing 11 with a show 12 at the lower end thereof, and an open hole 13 below the casing. Producing formations 21, 22, 23 and 24 are illustrated schematically at one side of the illustration of the open hole. To the right of the well bore illustration is a schematic illustration of a temperature log obtained from a temperature survey taken prior to treatment of the well. The absolute or temperature gradient log curve is indicated by the numeral 50, the increase in temperature being indicated by the slope of the curve to the right. The temperature different curve is indicated at 50 and indicates by deviations from the vertical the changes in the temperature between closely adjacent areas in the well bore. After the first base log has been obtained, a first stage of stimulation of the well is introduced in the usual manner by pumping from the well surface treating fluid, which may be an acid fracturing fluid, water, or oil, or the like, introduced into the well bore and pumped in the usual manner into one of the zones in the well. The treating fluid introduced into the well may be intentionally initially heated or cooled, if necessary, to provide a temperature differential between the ambient or formation temperature and the temperature of the treating fluid. It is desirable that at least a ten degree F. difference between the ambient surface temperature of the treating fluid and the bottom hole temperature of the formations to be treated exist. Whether the fluid is 10 degrees F. hotter or 10 degrees F. colder is not of consequence, so long as a sufficient differential exists to facilitate the recording of the temperature anomaly produced by entry of the fluid into the particular strata or zone of the well bore. The temperature of the treating fluid is altered prior to pumping the teating fluid into the well so that the significant differential will exist. This may be done by either heating or cooling the treating fluid prior to the introduction of the same into the well. It is usually easier and quicker to heat fluid than to cool it; and, therefore, most treating operations requiring a change of fluid temperature are carried out by using a fluid hotter than the bottom hole temperature. This may be effected in the usual manner by a "hot oil truck" or a steamer truck being used to heat the fluids introduced into the well. After the treating fluid has been pumped into the well and displaced by pressure into the formation in the usual manner of treating wells, the temperature logging tool is run into the well bore and the record of the temperature gradient and the temperature differential curves obtained, following such treatment, and compared to the base log previously taken.

As schematically shown in FIGURE 2, the treating fluid has entered the second zone 22 which is shown hatched vertically, and, as a result, the temperature gradient curve 50 at that zone or that depth in the well shows a decrease in temperature at 51 at that level in the well bore. Also, the temperature differential curve 60 shows a sharp change 61 at that level, indicating that the treating fluid has entered the second zone 22. Several logging runs are usually made, and each is carefully inspected for new anomalies over the base log, or for the decay rate of previous anomalies, "Ghost" anomalies, resulting from washouts, cavities in the bore hole, or the like, may also appear on the logs. From the logs so obtained, and schematically illustrated generally in FIGURE 2, the operator can determine that zone 22 has been treated. Also, the substantial extent of a zone is obtained from the driller's log of the well and from other types of logs of the well previously taken, and with the information obtained from the temperature log and available from the previous logs, the operator then determines the volume or size of the diversion material or blocking material charge or "plug" to be pumped into the well prior to the second stimulation stage. Such diversion material may be one or more of a number of materials, commonly, however, salt, moth balls or the like, carried in a concentration of gels for supporting and carrying the blocking or diverting material. The diverting material may be salt, paraffin beads, silicon compounds or sand, various naphthalenes, walnut shells, natural or crushed, leather particles, oyster shells, limestone, aromatic resins, acetate film, rubber, or ball sealers of rubber, nylon or other synthetics suitable for the purpose. The particle shapes will vary from angular to spherical and may be regular or irregular in configuration. Various solvents are used for each to assure removal of the blocking agent after treatment, which may be water, hydrocarbons, acids, hydroxides, or the like. The temporary gels used for supporting the blocking agents may be emulsified acid, thickened water, or similar materials commonly in use for temporary gels. Permanent gels may include thickened water, silicate gels, cement slurries or the like.

The calculated volume of diverting material or blocking material is then pumped into the well bore, immediately followed by the next stimulation charge. The stimulation charges used may include thickened hydrocarbon, in situ gels consisting of oil, fatty acid caustic, refined oil, which may be refinery residuals, or native lease crude oils or crudes, thickened water, unaltered water, thickened acids, emulsified or unaltered[,] acid solutions, corrosion inhibitor additive may be included, scale inhibitor additives may be included, surfactants may be added, as may bactericides, cleaning solutions, conversion solutions, or heat generation materials such as magnesium or the like and muriatic, nitric, or other acid, In addition, a proppant may be incorporated in the treating fluid, to assure that the fractured formation or opened formation remains in an open condition. Such proppants may include sand, walnut hulls, glass beads, aluminum pellets, iron shot, plastic pellets, or the like. It is obvious that the proppants may form a part of the blocking agent. However, it is desired that a removable blocking agent form a major part of the diversion materital. It is for this reason that salt, or a naphthalene such as moth balls or the like, is commonly used to form a major portion of the blocking material in most cases. As a result of the use of such blocking agents, the aqueous fluids present in the well bore will dissolve the salt, or the liquid hydrocarbons present in the well bore or which may be introduced into the well bore as a portion of the treating fluid, will remove a major part of the blocking agent to permit the formation to produce. This removal of the blocking agent, however, is not accomplished until after all zones have been treated.

Following the injection of the diversioin or blocking plug and the second stimulation stage, one or more temperature logs are run. A schematic illustration of the well in which the second step has been effected is illustrated in FIGURE 3 where the third zone 23 is indicated by vertical cross-hatching to have been treated. The temperature log following such treatment is illustrated to the right of the schematic well bore illustration, and the temperature gradient curve 50 shows a reduction in the deviation or anomaly at 51 adjacent the second zone 22, but shows a sharp deviation or anomaly 52 adjacent the third zone 23. Likewise, the temperature differential curve still shows a slight deviation 61 adjacent the upper edge of the second zone 22, but shows a sharp deviation or anomaly 62 adjacent the third zone 23. The deviations to the right on the differential curve result from increases in the temperature at the slate or shale strata between the porous formations.

From the information available as a result of the temperature log and from the previous logs of the well, the operator determines the size of the diversion charge or plug to be used for closing off or blocking the third formation 23 prior to injection of a third stimulation stage. The diversion or blocking plug is then prepared and pumped into the well bore, immediately followed by the third stimulation or treating stage.

Figure 5:
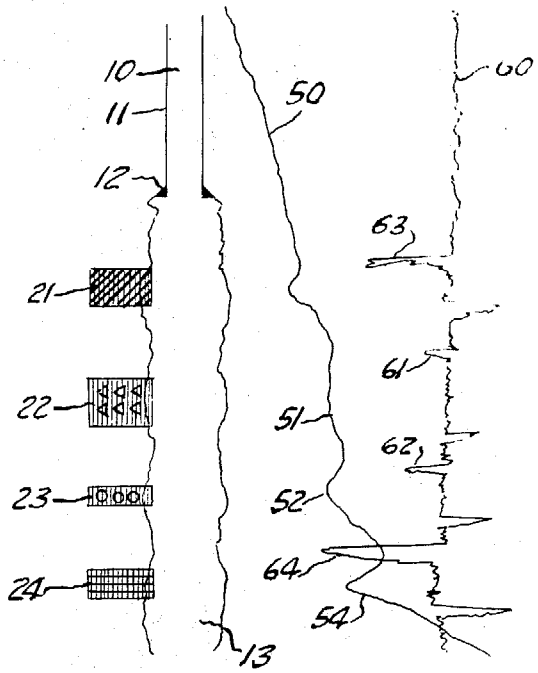
Figure 4:
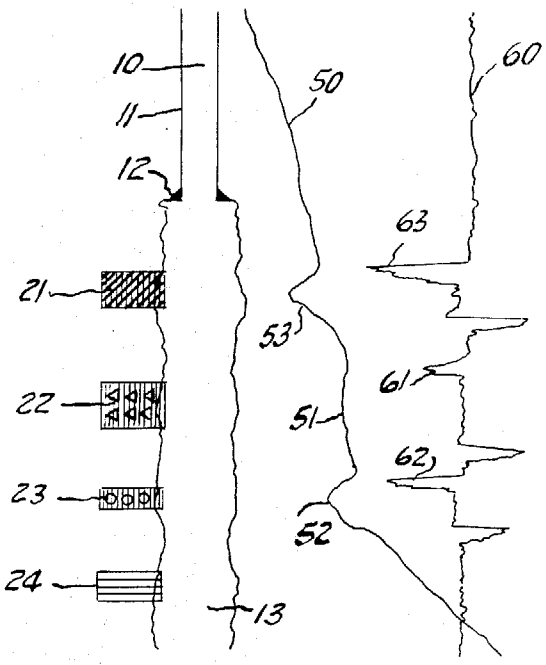
FIGURE 4 is a view similar to FIGURE 3 illustrating the third stage of treatment wherein the second and third zones are blocked and the upper zone is undergoing treatment; and, FIGURE 5 is a view similar to FIGURE 4 showing the upper three zones blocked and treatment being effected in the lowest of the zones.

Following the treatment of the well with the third stimulation stage a fourth series of temperature logs are taken and the logs compared with the previous logs. As shown in FIGURE 4, the temperature gradient log 50 shows an anomaly 53 adjacent the upper or first zone 21, indicating that the treating fluid has entered such upper zone. It will also be seen that the anomaly 52 adjacent the third zone 23 shows a temperature decay as compared to the deviation at that point shown in FIGURE 3. This indicates that no treating fluid has entered the third zone during this stage. The temperature differential log 60 also shows a sharp deviation or anomaly 63 adjacent the upper edge of the upper zone 21, and likewise shows decreases or decays in the anomalies existent adjacent the previously treated zones. This record clearly indicates that the upper zone 21 was treated by such third stage. From the information available from the logs, the proper blocking or diverting plug is calculated to seal off the upper zone 21, and the diversion plug is then pumped into the well bore in the manner previously set forth, followed by the next stimulation stage. Following such treatment, the temperature logs are taken and the schematic illustration in FIGURE 5 indicates that the lower or fourth zone 24 has been treated. The temperature gradient curve shows a sharp anomaly 54 adjacent the lower zone 24, and similarly shows a decay of the anomalies 51, 52, and 53 when compared with the previous logs of FIGURES 2, 3 and 4. In addition, the temperature differential curve 60 shows a sharp anomaly 64 adjacent the lower zone 24, and likewise shows a decay in the anomalies previously noted. It is also indicated at the lower end of the curves that the temperature has risen substantially below the lower zone. This log indicates that all four zones previously known to be present in the well have been successfully treated.

It is believed readily apparent that the several steps outlined may be altered or adjusted, depending upon the interpreted results of the down-hole temperature logging. The various stages may be increased, decreased, or eliminated, as determined desirable from the down-hole conditions indicated by the logs.

It is also believed readily apparent that *in* a producing or injection well in which only certain zones are desired to be treated, it is not necessary that the treating fluid be pumped into the well. Instead, after the base log has been run, a "dummy" fluid, which may not be a stimulation fluid, but a fluid used simply to indicate or locate the zone accepting the fluid, is pumped into the well. The steps previously outlined for treatment of the several zones of the well are then followed until it has been indicated that the zone which it is desired to treat shows on the temperature log to be accepting the dummy fluid by the temperature anomaly appearing on the logs adjacent that formation. At this point, a stimulation stage of treating fluids is injected into the well without previously injecting the diverting or blocking plug or charge so that the treating fluid is thus inserted or injected into only the zone desired to be treated. In cases where there are other zones in which treatment is desired, the process may be continued until all such zones have been treated.

In certain wells in which some of the zones have been previously treated and require no further treatment, there may be a selected zone which it may be desired be treated. The process just described, using the dummy fluids to determine the point at which the zone to be treated is accepting fluid is followed, and at that point the desired zone is then treated with the desired treating fluid or stimulation stage.

It is also believed readily apparent [tht] *that* only certain zones may be desired to be treated in the well and the procedure outlined hereinabove may be followed for that purpose. The location of channels, communication between zones or "thief" zones may be determined by following basically the procedure outlined hereinabove. Also, zones to be treated may be defined before treatment by following the procedure outlined utilizing the dummy fluids previous to inserting the treating fluid. In addition, a permanent seal of a zone may be [affected] *effected* by following the precedure outlined, utilizing dummy fluids and blocking or diversion fluids, except that when the zone to be treated is determined to be accepting fluid, a permanent sealant may then be inserted into such zone.

It is also readily apparent that the diverting fluid may include a proppant for maintaining the blocked-off or closed-off zone in an open condition after the diverting materials have [ben] *been* moved from the zone by solution, washing, or the natural flow of fluids from the well, or the like. It is also readily apparent that where wells have been deepened, and it is not desired to treat the older portion of the well bore, the process outlined utilizing the dummy fluids may be followed to seal off the old previously treated zones and to treat only the desired zones.

It is believed readily apparent that the method of this invention provides for accurate, selective treatment of well formations, that control of the use of diverting or blocking material, as well as treating materials, may be accurately computed and result in a more economical treatment of the wells, eliminating re-treatment necessary under the continuous process or other processes. It is also believed that it is apparent that zones which could not be treated by the other processes may be treated utilizing this process. Also, it is readily apparent that this method results in complete treatment of the several zones present in the well bore and an accurate determination that all such zones have been successfully treated. The process permits evaluation of all zones treated; provides for accurate calculation and introduction of diverting agents after each treating stage; permits immediate recognition of any communicating or channelling problem or irregular existing downhole conditions in the well bore; assures that all productive intervals are stimulated for improved, sustained future production. Actual tests have indicated that wells previously treated by the commonly used methods, which have been subsequently treated by this method, have resulted in increases of production of flow of fluid of the order of four to five times or more over the previous production.

It will therefore be seen that all the objects desired have been accomplished as described.

The foregoing description of the invention is explanatory only and changes in the procedures used, the materials used and the steps of the method followed, may be made by those skilled in the art within the scope of the appended claims without departing from the spirit of the invention.

What is desired to be secured by Letters Patent is:

1. A method of treating a well drilled into earth strata comprising: making a temperature survey of the well bore to establish a base curve of temperature gradient and temperature differential in the well bore; treating the earth strata in said well bore; making a temperature survey of the well bore following such treatment; determining the strata treated; selectively treating another strata area in said well bore other than the strata area previously treated; and making a temperature survey to determine that the desired strata area has been treated.

2. The method of claim 1 wherein the treating is effected by introducing into the well bore fluid altered to a temperature differing from the ambient formation temperature in the earth strata being treated.

3. A method of treating a well drilled into earth strata comprising: making a temperature survey of the well bore to establish a base curve of temperature gradient and temperature differential in the well bore; inserting a treating fluid charge into the well bore to treat the earth strata therein; making a temperature survey of the well bore following such treatment to determine the strata area treated; blocking off the area first treated and inserting a second treating fluid charge into the well following such blocking; making a temperature survey of the well bore following insertion of such second treating fluid charge and determining the well strata treated by such second charge; then repeating the blocking, treating and surveying steps of the process as desired until all desired strata in the well have been treated.

4. A method of treating a well as set forth in claim 3 wherein the temperature of the treating fluid inserted into the well bore differs from the temperature of the earth strata being treated, whereby entry of the treating fluid into the treated earth creates a temperature differential at such point detectable by said temperature survey.

5. A method of treating wells as set forth in claim 4 wherein the temperature of the treating fluid is altered at the surface preparatory to insertion into the well.

6. A method of treating wells as set forth in claim 4 wherein the treating fluid is heated at the surface to a value above the highest ambient formation temperature in the earth strata being treated.

7. A method as set forth in claim 3 wherein the blocking of the treated areas is effected by means of a diverting blocking agent closing off entry of treating fluid to such zone, such diverting blocking material being inserted into the well bore prior to the treating fluid charge.

8. A method of treating a well of the character set forth in claim 3 wherein the blocking off of the treated area is effected by means of a diverting blocking material having a proppant forming a part thereof.

9. A method of the character set forth in claim 8 wherein the diverting blocking material comprises one or more of the group consisting of salt, wax paraffin, silicon compounds, naphthalene compounds, nut shells, leather particles, oyster shells, lime stone, aromatic resin, acetate film, natural or synthetic rubber, and ball sealers of rubber, rubber coated nylon or similar plastics.

10. A method of treating a well as set forth in claim 8 wherein the proppant forming a part of the diverting blocking material consists of one or more of the group including sand, nut hulls, glass beads, aluminum pellets, iron shot.

11. A method of treating a well drilled into earth strata comprising: making a temperature survey of the well bore to establish a base curve of temperature gradient and temperature differential in the well bore; treating the earth strata in said well bore; making a temperature survey of the well bore following such treatment to determine the strata area treated; again treating and controlling treatment of the earth strata to treat a strata area in said well bore other than the strata area previously treated; and making a temperature survey to determine that the desired strata area has been treated.

12. A method of treating a well drilled into earth strata having a plurality of separate formations, said method comprising: making a temperature survey of the well bore to establish a base curve of temperature gradient and temperature differential in the well bore; introducing a treating fluid into the well bore to treat the earth strata in said well bore; making a temperature survey of the well bore following such treatment to determine the formation treated; selectively treating the several formations in the well in successive treatments to selectively successively treat a formation other than the formation previously treated; making a temperature survey of the well bore following each such treatment to determine that the desired formation has been treated; and repeating the steps of selective treatment and surveying until all desired formations in the well have been treated.

13. A method of treating a well drilled into earth strata comprising: making a temperature survey of the well bore to establish a base curve of temperature gradient and temperature differential in the well bore; treating the earth strata in said well bore; making a temperature survey of the well bore following such treatment to determine the strata treated; selectively treating another strata in the well bore other than the strata previously treated; making a temperature survey to determine that the desired strata has been treated; and repeating selective treatment of the several strata in the well in successive treatments; and determining by temperature survey that the desired strata has been treated following each treatment.

14. A method of treating a well drilled into earth strata comprising: making a temperature survey of the well bore to establish a base curve of temperature gradient and temperature differential in the well bore; inserting a treating fluid charge into the well bore at a temperature differing from the ambient temperature of the earth strata to treat the earth strata therein; making a temperature survey of the well bore following such treatment to determine the strata area treated; inserting a second treating fluid charge into the well bore at a temperature differing from the ambient earth strata temperature to treat another earth strata area than the strata area previously treated; making a temperature survey of the earth strata following insertion of such second treating fluid charge to determine that the desired earth strata area has been treated by said second charge.

15. A method of treating a well as set forth in claim 14 wherein the treating fluid charge inserted into the well comprises an acidizing fluid or hydraulic fracturing fluid to induce improved flow of fluids in the formation into and out of the well bore, or both.

16. A method of treating a well as set forth in claim 14 wherein the treating fluid charges inserted into the well are heated at the surface to a value above the highest ambient earth strata temperature in the strata being treated.

17. A method of treating a well as set forth in claim 14 wherein the treating fluid charges inserted into the well are cooled at the surface to a value below the lowest ambient earth strata temperature in the strata being treated.

18. A method of treating a well as set forth in claim 14, and the additional steps of: inserting successive treating fluid charges into the well bore at a temperature differing from the ambient temperature of the earth strata being treated to successively selectively treat another earth strata area than the strata areas previously treated; and making a temperature survey of the earth strata following each successive insertion of treating fluid to determine that the desired earth strata area has been treated by successive treating fluid charges.

*19. A method of treating a well drilled into earth strata comprising: establishing a base temperature curve for a well; treating the earth strata in the well bore; making a temperature survey of the well bore following each treatment to determine the area treated and any need for further treatment; and treating the earth strata in the well bore indicated by said log to need treatment.*

*20. A method of treating a well as set forth in claim 19 and the further step of making a temperature survey of the well bore after any such further treatment to determine that the indicated additional needed treatment has been effected.*

*21. A method of treating a well drilled into earth strata comprising: establishing a base temperature curve for the well; treating the earth strata in the well bore; making a temperature survey of the well bore following such treatment; comparing said survey so made with said established base temperature curve for the well to determine the effect of the treatment on the earth strata in the well bore and the need for additional treatment; and further treating the well as indicated by the survey to be needed.*

*22. A method of treating a well as set forth in claim 21 and the further step of making a temperature survey of the well bore after any such further treatment to determine that the indicated additional needed treatment has been effected.*

*23. A method of treating a well drilled into earth strata comprising: inserting a fluid charge into the well bore; making a temperature survey of the well bore following such insertion of a fluid charge; determining the effect of the fluid charge on the earth strata in the well bore by means of such temperature survey and the need for further treatment of the well strata; and inserting a fluid treating charge into the well bore as determined from the temperature survey to be needed.*

*24. A method of treating a well as set forth in claim 23 and the further step of making a temperature survey of the well bore after any such further treatment to determine that the indicated additional needed treatment has been effected.*

*25. A method of treating a well drilled into earth strata comprising: inserting a treating fluid charge into the well bore; making a temperature survey of the well bore following insertion of such treating fluid charge; comparing the survey so made against a previously established temperature gradient curve for the well to determine the effect of the treating fluid charge on the earth strata in the well bore and the need for additional treatment; and further treating the well where indicated by the survey made following the insertion of the previous treating fluid charge.*

*26. A method of treating a well as set forth in claim 25 and the further step of making a temperature survey of the well bore after any such further treatment to determine that the indicated additional needed treatment has been effected.*

*27. A method of treating a well drilled into earth strata comprising: establishing a base curve of temperature gradient in the well bore; treating the earth strata in said well bore; making a temperature survey of the well bore following such treatment to determine the strata area treated; again treating and controlling treatment of the earth strata to treat a strata area in said well bore other than the strata area previously treated; and making a temperature survey to determine that the desired strata area has been treated.*

References Cited

The following references, cited by the Examiner, are of record in the patented file of this patent or the original patent.

UNITED STATES PATENTS

| | | | |
|---|---|---|---|
| 2,050,128 | 8/1936 | Schlumberger | 166—253 |
| 2,242,612 | 5/1941 | Leonardon | 73—154 |
| 2,290,075 | 7/1942 | Schlumberger | 73—154 |
| 2,383,455 | 8/1945 | Abadie | 73—154 X |
| 2,676,489 | 4/1954 | Basham | 73—154 X |
| 2,803,526 | 8/1957 | Nowak | 166—254 X |
| 3,122,016 | 2/1964 | Fordham | 73—154 |
| 3,135,324 | 6/1964 | Marx | 166—251 |
| 3,410,136 | 11/1968 | Johns et al. | 73—154 |

OTHER REFERENCES

Frick et al.: Petroleum Production Handbook, vol. II, Reservoir Engineering, McGraw-Hill Book Co., Inc., New York, N.Y. (1962), (pp. 45–23 to 45–25, relied on).

STEPHEN J. NOVOSAD, Primary Examiner

U.S. Cl. X.R.

73—154; 166—303, 307, 308